United States Patent [19]

Landis

[11] Patent Number: 5,114,514

[45] Date of Patent: May 19, 1992

[54] BONDING OF THERMOPLASTIC SHEET MATERIAL TO ROUGHENED SUBSTRATES

[75] Inventor: Newton C. M. Landis, Penfield, N.Y.

[73] Assignee: Eastman Kodak Company, Rochester, N.Y.

[21] Appl. No.: 530,390

[22] Filed: May 30, 1990

[51] Int. Cl.⁵ .................. B32B 31/00; B32B 31/12; B29C 65/00
[52] U.S. Cl. .................. 156/153; 156/212; 156/285; 428/40; 428/409
[58] Field of Search .............. 156/153, 285, 212; 428/409, 40

[56] References Cited

U.S. PATENT DOCUMENTS

| | | | |
|---|---|---|---|
| 3,193,424 | 2/1965 | Scott | 156/73 |
| 3,449,176 | 6/1969 | Klass et al. | 156/153 X |
| 3,551,232 | 12/1970 | Thompson | 156/87 |
| 4,321,307 | 3/1982 | Bragole et al. | 428/423.1 |
| 4,769,100 | 9/1988 | Short et al. | 156/285 |
| 4,778,548 | 10/1988 | Fox et al. | 156/153 |
| 4,798,772 | 1/1989 | Furakawa | 428/687 X |
| 4,824,506 | 4/1989 | Hoerner et al. | 156/285 X |
| 4,828,637 | 5/1989 | Mentzer et al. | 156/285 X |
| 4,861,407 | 8/1989 | Volkmann et al. | 156/153 X |
| 4,936,936 | 6/1990 | Rohrbacher | 156/245 X |
| 5,026,448 | 6/1991 | Reafler et al. | 156/212 |
| 5,034,269 | 7/1991 | Wheeler | 428/317.5 X |

FOREIGN PATENT DOCUMENTS

| | | | |
|---|---|---|---|
| 56-17226 | 4/1981 | Japan | 156/153 |
| 1-166956 | 6/1989 | Japan | 156/153 |
| 8904257 | 8/1989 | PCT Int'l Appl. | 428/40 |

OTHER PUBLICATIONS

Barrett et al., *The Principles of Engineering Materials:* Englewood Cliffs, N.J., Prentice-Hall, Inc., 1973, p. 86.

Primary Examiner—Michael W. Ball
Assistant Examiner—Adrienne Johnstone

[57] ABSTRACT

A protective and decorative sheet material, such as a paint-coated film, which is bonded by an adhesive layer and vacuum thermoforming to a substrate, can develop surface roughness when exposed to heat for extended periods of time. This defect is unexpectedly reduced or eliminated by raising the surface energy of the substrate and roughening the surface of the substrate within certain limits, prior to application of the sheet material.

14 Claims, 1 Drawing Sheet

BONDING OF THERMOPLASTIC SHEET MATERIAL TO ROUGHENED SUBSTRATES

FIELD OF THE INVENTION

This invention relates to a process for bonding a protective and decorative thermoplastic sheet material to a substrate and, more particularly, to such a process wherein the tendency of the bonded sheet material to develop an undesirable surface texture when heated is reduced or eliminated.

BACKGROUND OF THE INVENTION

As an improvement over the spray painting of articles such as automobile bodies, boats and household appliances, a new kind of paint-coated sheet material (also called paint-coated film) has been developed to provide protective and decorative finishes. The new material comprises a flexible, stretchable, thermoplastic carrier film which has a protective and decorative paint layer of uniform thickness and appearance on one side, and, optionally, an adhesive layer on the other side. It can also have other layers such as a tie or bonding layer between the paint layer and the carrier film. In a preferred embodiment, a transparent topcoat covers the paint layer. This combination provides an attractive basecoat-clearcoat appearance which is especially desirable for automotive finishes.

Using known vacuum thermoforming procedures, the paint-coated film can be stretched and bonded to an article such as an automobile body panel to give a basecoat-clearcoat finish. Advantages of obtaining such finishes by the use of paint-coated film instead of by spray painting include improved control of evaporating solvents, which reduces air pollution, and the elimination or reduction of paint sludge as a hazardous waste product. Furthermore, the new paint-coated film has a remarkably smoother and more attractive appearance than spray painted finishes. This new type of thermoformable sheet material and a process for its manufacture are described in the G. G. Reafler U.S. patent application Ser. No. 116,426, filed Nov. 3, 1987 now abandoned. The process involves applying the paint composition to the surface of the thermoplastic carrier film by laminar flow coating, followed by drying and then coating and drying each additional layer in sequence to obtain a paint-coated film of excellent gloss and smoothness.

The paint-coated film can be stretched and bonded by vacuum thermoforming to a three dimensional substrate such as an automobile panel to form a bonded article. Alternatively, the film can be bonded by simply pressing the film against the substrate surface. Unlike the vacuum thermoforming procedure which is most suitable for attaching a protective and decorative sheet material to a three-dimensional substrate, this procedure is commonly used for covering essentially planar surfaces for "toning and styling" purposes. When the sheet material is used as a toning and styling film, it need not be thermoformable, although flexibility and moderate stretchability are desired. The film is simply stretched along the length of the panel to be covered and pressed by hand into adhesive contact with the panel. The film can be mildly heated to aid in conformance to moderate contours.

Whichever mode of bonding is used, and notwithstanding the film's excellent decorative and protective characteristics, this high quality sheet material can develop objectionable surface defects if the bonded article is subjected to high temperatures over a period of time. A defect that can occur, for example, if an automobile covered with the paint-coated sheet material is exposed to the hot sun on a warm day for several hours, is known as "texturing". This is a roughening of the surface of the paint-coated film or sheet material which detracts from the beauty of the normally smooth, glossy surface. Such texturing can be caused or contributed to by more than one factor but it has now been found that a significant or major factor is the character of the substrate surface to which the adhesive-coated sheet material is bonded. As a result of this discovery, the present invention provides a process for bonding a protective and decorative sheet material to a substrate in a manner which reduces or controls the extent of a subsequent texturing of the surface of the sheet material.

A vacuum forming process for adhesively bonding a thermoplastic sheet to an interior automobile panel is described in U.S. Pat. No. 3,551,232. The objective of this patent is to overcome the problems of bubbling and blistering of the thermoplastic sheet that tends to occur in the vacuum-forming process. It achieves this by use of an adhesive which contains an inert particulate filler for the purpose of minimizing the entrapment of air. The use of an adhesive composition that contains granular particles is not believed to be conducive to obtaining a smooth surface. Furthermore, in the case of exterior automobile panels, it is necessary not only to prevent air entrapment during the bonding operation, but also to avoid later development of surface texturing.

U.S. Pat. No. 3,193,424 to John A. Scott relates to a method of increasing the strength of the adhesive bond formed between metal parts by disposing between the confronting surfaces of the elements to be joined a layer of liquid adhesive containing a finely divided solid abrasive substance, developing a relative movement of said elements to abrade the confronting surfaces, and curing the adhesive to bond the surfaces together.

U.S. Pat. No. 4,778,548 to Joseph R. Fox refers to a method of bonding carbon composite frictional materials to solid substrates with a high temperature adhesive which includes roughening the surface of the substrate by sandblasting, chemical etching, etc. prior to applying the adhesive and subsequent heating.

While the above-cited patents relate to the bonding of adhesive coated films, webs and sheets to a substrate for a variety of purposes, none of them offer any suggestion that a specific combination of substrate roughness and surface energy will prevent texturing of the bonded film, web or sheet under high temperature conditions.

According to Bragole et al., U.S. Pat. No. 4,321,307, the adhesion of polymeric bodies to painted substrates can be enhanced by raising the paint coating's critical surface tension through irradiation. While the patent shows that the adhesion of polymeric bodies to a paint coat can be improved by raising the paint coat's surface tension of wetting through irradiation, such treatment does not prevent texturing of a bonded paint-coated film when subjected to high temperatures, as will be shown hereinafter in more detail.

SUMMARY OF THE INVENTION

In accordance with the present invention, there is provided a process for adhesively bonding a protective and decorative sheet material to a substrate which process comprises:

a) applying a layer of a pressure-sensitive adhesive composition to a surface of the sheet material;

b) treating a surface of the substrate which is to be bonded to the sheet material to roughen the surface and to raise its surface energy to a level corresponding to a critical surface tension of wetting of at least about 40 dynes per cm and to provide a substantially uniform surface roughness; and c) pressing the adhesive layer of the sheet material into bonding contact with the treated surface of the substrate, wherein the roughness average of the roughened surface ranges from about 1 to about 100 microinches, and the surface being sufficiently smooth such that the sheet material when bonded thereto has a 20° gloss of at least about 80 and a DOI of at least about 80.

The present invention offers a solution to the problem of surface texturing that may develop in adhesively bonded sheet materials such as paint-coated film during their exposure to excessive heat. It can be used alone or in combination with other procedures designed to overcome such problems. No expensive equipment is required. Nor is it necessary to substantially modify established manufacturing procedures.

A highly unexpected aspect of this invention is that, while one would not expect a roughening of the substrate surface to improve film smoothness, it does so provided the created roughness is in the form of sub-visible micro bumps.

BRIEF DESCRIPTION OF THE DRAWINGS

The invention will be further described with reference to the drawings of which.

DETAILED DESCRIPTION OF THE INVENTION

The invention is described herein with particular reference to the manufacture of thermoformable, decorative and protective sheet materials used in the automotive industry. The surface smoothness of automotive finishes is extremely important and therefore, the high quality of the paint-coated films is especially important in that field. However, the process of the invention can be used in the manufacture of any web having a pressure-sensitive adhesive layer by which the web is bonded to a substrate. For example, the web can be a paint-coated stretchable film, as exemplified herein, or such a film having other kinds of coatings, or even an uncoated film.

Figure 1:
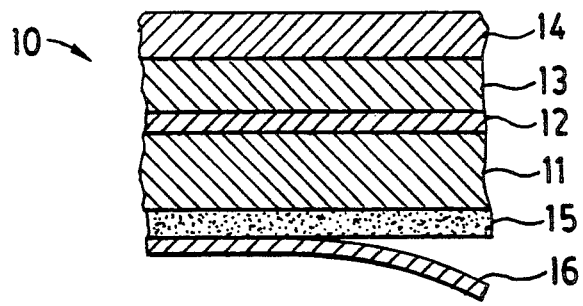
FIG. 1 shows an enlarged cross-section, not to scale, of a protective and decorative sheet material used in the process of the invention.
Figure 2:
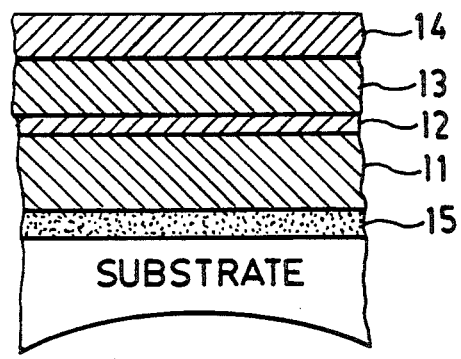
FIG. 2 is a fragmentary cross-sectional view of a paint-coated article in accordance with this invention.

FIG. 1 is a diagrammatic cross-sectional side view, not to scale, of a thermoformable sheet material 10 used in the process of this invention. The sheet material comprises a thermoplastic carrier film 11 which is an essentially planar, self-supporting, stretchable, thermoplastic polymeric film which can be transparent, translucent or opaque. It has a substantially uniform thickness preferably in the range from about 0.05 to 0.40 millimeters.

The carrier film has heat softening and tensile elongation properties suitable for the thermoforming process. The carrier film of this invention is capable of extension to an extended are up to at least 50% greater than its relaxed area. Moreover, the carrier film of this invention is characterized by having a substantially uniform quality and appearance in both the relaxed and extended states. The preferred carrier film of this invention is capable of extension to an extended area up to at least 100% greater than its relaxed area. Highly preferred sheet material is capable of extension to an extended area up to at least 200% greater than its relaxed area.

Further, a given relaxed size of the carrier film should be capable of stretching different degrees in different areas, stretched in some areas and not in other areas and still maintain a substantially uniform appearance (i.e. distinctness of image and gloss remaining largely the same). Preferred polymeric materials for the film are those known to be useful in thermoforming and/or vacuum-forming techniques, such as polyvinyl chloride, polyvinyl acetate, and ABS (acrylonitrile-butadiene-styrene) resins. Useful carrier film materials include the polyacrylate blends with copolyesters described in U.S. Pat. No. 4,246,318, and the copolyesters derived from aromatic polyesters and glycol polyesters described in U.S. Pat. No. 4,287,325. Blends of rubber-modified styrene-maleic anhydrides with polycarbonates and/or polyesters are also useful, as are blends of poly(ether-esters) and polyesters. Particularly preferred carrier film materials exhibit a tensile elongation at break of at least about 40 percent when measured in accordance with ASTM D-638. A highly preferred carrier film material is a blend of copolyesters based on poly(1,4-cyclohexylenedimethylene terephthalate) and rubber-modified styrene-maleic anhydride copolymers as described in U.S. Pat. No. 4,582,876. A specific example of a polymer blend of this kind which can be extruded as a carrier film consists of a blend of 55:45 percent by weight of a copolyester and "Dylark 600" styrene copolymer. The latter is a rubber-modified styrene-maleic anhydride copolymer obtained from ARCO Chemical Company, a division of Atlantic Richfield Company. The copolyester is derived from terephthalic acid, 19 mole % ethylene glycol and 81 mole % 1,4-cyclohexanedimethanol.

Other examples of stretchable carrier films include the highly flexible and stretchable films which are made by the extrusion of blends of a flexible poly(etherester) with a more rigid polyester as described in the copending application of Seymour, Ser. No. 151,727 filed Feb. 7, 1988, now U.S. Pat. No. 4,904,748. The carrier film can include fillers, UV absorbers, plasticizers, colorants, antioxidants, etc., known to be useful in polymeric films.

Coated on the carrier film 11 is a basecoat (or paint layer) 13 which preferably has a mean dry thickness in the range from about 0.012 to 0.08 millimeters. Preferred basecoat compositions are aqueous dispersions of a film forming binder resin and pigment with one or more organic solvents which serve as coalescing agents or the like.

Basecoat layers for the sheet materials comprise a colorant incorporated in a film forming binder. Conventional colorants for paint compositions can be employed, including inorganic pigments such as iron oxide, chromium oxide, lead chromate, carbon black, metallic oxides, silicates, chromates, etc., and organic pigments or dyes, such as phthalocyanine blue, phthalocyanine green, carbazole violet, perylene reds, diazo red and others known to those skilled in the art.

The basecoat layer can contain any light-reflective particles conventionally employed in paints, particularly those employed in automotive finish paints. Suitable reflective particles include metallic flakes such as aluminum flake, copper flake, bronze flake, magnesium flake, silver flake, gold flake, platinum flake and other platelets such as mica, glass, stainless steel, coated mica, coated glass and aluminum coated polyester film fragments. Mixtures of two or more types of particles can be used. Although not all of these light-reflective flakes are metals, they give a metallic appearance to the paint-coated film. Hence, for convenience, all paints which contain light-reflective flakes are referred to as metallic paints.

Although not always essential, a thin tie-layer 12 can be coated and dried on the carrier film before the basecoat layer is coated, in order to improve the bonding of the basecoat to the carrier film 11.

Tie-layers can be formed from compositions such as those described in Krenceski et al., U.S. patent application Ser. No. 313,198 filed Feb. 17, 1989, now U.S. Pat. No. 4,933,237.

The tie-layer preferably has a thickness not greater than about 0.0025 millimeter and preferably is much thinner than the pigmented inner layer applied to it.

Clearcoat layer 14 is a transparent topcoat having a mean dry thickness preferably in the range from about 0.010 to 0.07 millimeter and preferably comprises a crosslinked polymer such as a crosslinked polyurethane formed by mixing a polyester polyol and a polyisocyanate curing or crosslinking agent.

Compositions for the clear topcoat layer 14 in FIG. 1 are two-component crosslinkable polymeric compositions which are useful as clearcoats for automotive surface finishing. They are transparent and comprise (a) as one component, a crosslinkable polymeric polyol such as a polyester polyol, a polyurethane polyol, or polyether polyol and (b) as a second component, a polyisocyanate curing or crosslinking agent. Each component is dissolved in a volatile organic solvent such as acetone, toluene or a mixture of acetone and toluene.

Especially preferred for the topcoat is a two-package system comprising a polyurethane polyol and a polyisocyanate crosslinking agent as disclosed in the patent to Porter, U.S. Pat. No. 4,719,132. The isocyanate component can be either an aliphatic or an aromatic polyisocyanate containing two or more isocyanate groups. Examples include 1,6-hexamethylene diisocyanate supplied by Mobay Chemical Company as KL5244. Other examples include toluene diisocyanate, 4,4-methylene-bis(cyclohexyl isocyanate) and the isocyanurate from isophorone isocyanate supplied by Veba Company as T1890. Also useful are blocked polyisocyanates which unblock when the coating composition is heated to curing temperatures. Aliphatic isocyanates are greatly preferred because of their superior resistance to discoloring.

Other useful clearcoat compositions include those described in the patents to Ambrose et al., U.S. Pat. No. 4,699,814; Simpson et al., U.S. Pat. No. 4,650,718; Singer et al., U.S. Pat. No. 4,681,811; Singer et al., U.S. Pat. No. 4,703,101; and Backhouse, U.S. Pat. Nos. 4,220,679 and 4,403,003.

Subsequently, an adhesive layer 15 is coated on carrier film 11 opposite paint layer 13. Preferred adhesives for this layer are acrylic compositions, including acrylic copolymers of a higher alkyl acrylate such as 2-ethylhexyl acrylate copolymerized with a polar comonomer such as acrylic acid, acrylamide or maleic anhydride, a preferred composition being the aqueous acrylic adhesive, SHRINK WRAP ADHESIVE HC7803-VAC, supplied by PPG Industries, Inc. The adhesive is coated from a solution with water or an organic solvent which also can contain additives such as a tackifier resin. Further examples of useful acrylic pressure-sensitive adhesives are described in the patent to Traynor et al., U.S. Pat. No. 4,726,982 of Feb. 23, 1988.

Following the application of the adhesive layer 15, the sheet material is interwound with a thin releasable protective web 16 off, e.g., polyester film, to permit tack-free winding of the sheet material 10 on a core. A preferred method of interwinding is described in Hakiel et al., U.S. patent application Ser. No. 272,271, now U.S. Pat. No. 4,921,556, filed Nov. 17, 1988.

The method by which the layers of the product are formed uniformly on the carrier film preferably is laminar flow coating, as disclosed in the Reafler patent application Ser. No. 116,426, filed Nov. 3, 1987 now abandoned.

A variety of coating techniques are useful, such as direct extrusion onto the support by use of an extrusion hopper functioning to apply the coating composition by a bead coating or a stretch-flow coating mechanism, extrusion of the coating composition through a slot with subsequent travel down the slide surface of a slide hopper or subsequent free fall in a curtain coating process, curtain coating processes in which the curtain is generated by the use of an overflow weir, and so forth. The critical aspect of the coating process is its ability to provide a defect-free coating with a very high degree of uniformity of layer thickness. In view of the flexible nature of the support, it can be coated using conventional web transport systems and will, for reasons of economy, typically be coated at web widths of up to two meters or more and web speeds of up to several hundred meters per minute.

The use of precision coating processes in the production of the sheet material—such as for example the use of high precision extrusion hoppers—is a very important aspect of the present invention. In particular, the coating operation must be conducted with exacting control of all critical parameters to ensure the very high degree of thickness uniformity and the freedom from coating defects that characterize the sheet material of this invention. It is only by such control of both thickness uniformity and coating defects, that sheet material can be produced which is capable of undergoing the rigors of the thermoforming process and, at the same time, is capable of yielding a product exhibiting the very high quality demanded of an automotive finish.

Extrusion hoppers are particularly effective devices for use in the process of this invention. Such devices are well-adapted for use with compositions which exhibit the shear-thinning characteristics typical of the paint compositions hereinbefore described. In such hoppers, transverse pressure gradients are minimized and almost all pressure drop across the slot is in the direction of coating. While applicant does not wish to be bound by any theoretical explanation of the manner in which his invention functions, it is believed that such features contribute to the excellent results achieves with an extrusion hopper, especially in the coating of paint compositions containing reflective flakes.

Preferred coating techniques and apparatus useful in the practice of the present invention are used in the manufacture of photographic products and are described in U.S. Pat. Nos. 2,253,060, 2,289,798, 2,681,294, 2,815,307, 2,898,882, 2,901,770, 3,632,274 and 4,051,278.

Also, they preferably are dried by means of a flat bed dryer having a vertical loop curing section and being provided with low velocity streams of heated air as described, e.g., in Fronheiser et al., U.S. Pat. No. 4,872,270.

Although laminar flow coating of the layers is highly preferred because of the excellent quality of such coatings and because of the control of environmental emissions that laminar flow coating affords, the layers can be applied by less desirable methods. Other such coating methods that have been proposed for paint-coated films include spraying and reverse roll coating as described in, for example, the patent to Short et al., U.S. Pat. No. 4,769,100 (General Motors), European Patent Application 285,071 A2, published Oct. 5, 1988 (Avery International Corp.); European Patent Application 266,109 A2 published May 4, 1988 (Rexham Corp.) which corresponds to U.S. Pat. No. 4,801,540; European Patent Application 230,364 published Jul. 29, 1987 (3M Company); and Research Disclosure No. 24303, July 1984.

Although the Reafler sheet material is the preferred film for use in the thermoforming method of the invention, the new method can also use other paint-coated films, several of which have been reported in recent patents and literature. See, for example, Short et al., U.S. Pat. No. 4,769,100; published European Patent Application 0230364, published July 1984; and SAE Technical Paper Series 890352, presented Feb. 27–Mar. 6, 1989, all of which disclose materials said to be useful in vacuum thermoforming. All of these references disclose examples of films believed to be useful, to a greater or lesser degree, in applicant's process.

Prior to the present invention it had been thought that the texturing phenomenon which occurs when the adhesively bonded film and substrate are heated was caused by entrapment of air bubbles between the film and the substrate surface. Indeed, air entrapment can cause surface texturing, i.e., unevenness of the upper surface of the film after the film's bonding to the substrate. However, even when great care is taken to avoid entrapment of air as by the use of a double vacuum chamber (see Harasta U.S. patent application Ser. No. 399,647, filed Aug. 28, 1989 now abandoned), the texturing effect can still develop. Likewise, a rough substrate can cause roughness of the paint-coated film surface. This is known as "show-through" or "telegraphing". But even with the smoothest of substrates it is still possible for the bonded film to develop texturing.

Initially, it was also though that texturing simply resulted from stress relaxation in the paint-coated film during heating; hence, it should be reduced or eliminated in an annealing step prior to high-temperature heat treatment (HTRT) such as 1 hour at 93° C. Indeed, initial success in eliminating texturing resulted from annealing paint-coated film bonded to steel and nylon substrates as long as the covered substrates were subjected to HTRT within a day or two after the annealing was complete. Annealing conditions ranged from overnight at 71° C. to six days at 49° C. However, it was soon found that the annealing is only a temporary fix lasting no longer than about two days.

It has now been found according to the present invention that texturing occurs because of inadequately intimate contact of the adhesive layer with the substrate, and that adequately intimate contact can be attained through a conditioning of the substrate surface so as to create a high surface energy and an average surface roughness within specified limits. Such conditioning includes physically roughening the substrate surface to a) raise its surface energy to a level corresponding to a critical surface tension of wetting of at least about 40 dynes per cm, and b) increase its roughness to a roughness average (Ra) of about 100 microinches to provide more area for interfacial contact.

The interfacial contact can further be enhanced by a) stretching the film prior to its contact with the substrate surface, b) selecting an aggressive adhesive, i.e., an adhesive that develops the desired intimate adhesive-to-substrate contact, and/or c) avoiding the entrapment of air bubbles between film and substrate during the bonding (i.e., thermoforming) procedure.

Air entrapment is a potential problem during thermoform covering. Entrapment of visible bubbles of air degrades the appearance—other than texturing—of the covered part, while the entrapment of micro bubbles, and especially rows and clusters of micro bubbles, may be associated with texturing. It has been found that air entrapment, in general, can be alleviated during thermoform covering by:

controlling the film draw-down rate;

heating the paint-coated film only to a temperature at which the elastic modulus remains above $10^9$ dynes per $cm^2$;

use of a thermoformer with double vacuum;

moving the substrate away from the film, thereby increasing film stretch and creating a greater vacuum at the instant when the film contacts the substrate surface; and/or treating the substrate and/or adhesive surface to provide escape passageways for air.

Texturing, when it occurs, is generally noted in adhesively bonded protective and decorative sheet materials such as paint-coated films after high-temperature resistance testing at 93° C. for one hour (herein referred to as HTRT). However, texturing has been observed after heat treatment at temperatures as low as 49° C. The degree of texturing becomes more severe as the treatment temperature is increased. Surface texturing is a roughening of the surface of the paint-coated film such that the film surface seems to become wrinkled or covered with "pimples". It results in loss of gloss and distinctness of image (DOI) and is quite objectionable from an appearance standpoint. The wrinkle form of texturing is similar to the appearance of "orange-peel" in conventional sprayed paint coatings.

Before or after exposure to elevated temperatures, the paint-coated film may take on the roughness of the substrate surface to which the film is adhered. This is generally referred to as "show-through", "print-through" or "telegraphing". Surface texturing as dealt with in this invention, is surface roughness in addition to any "show-through" from the substrate to the surface of the paint-coated film. Surface texturing may result in a more severe roughening of the paint-coated film surface than "show-through" and may be more objectionable in appearance.

Sheet material bonded to a substrate by the process of this invention preferably exhibits a) a 20° gloss of at least 80 when measured in accordance with ASTM TEST D-523, and b) a distinctness of image (DOI) of at least 80 as measured by ASTM TEST E-430. Following are descriptions of how "roughness", "roughness average, Ra" and "surface energy" are quantified for use herein.

"Roughness" consists of the finer irregularities of the surface texture, usually including those irregularities that result from the action of the surface treatment process.

Figure 3:
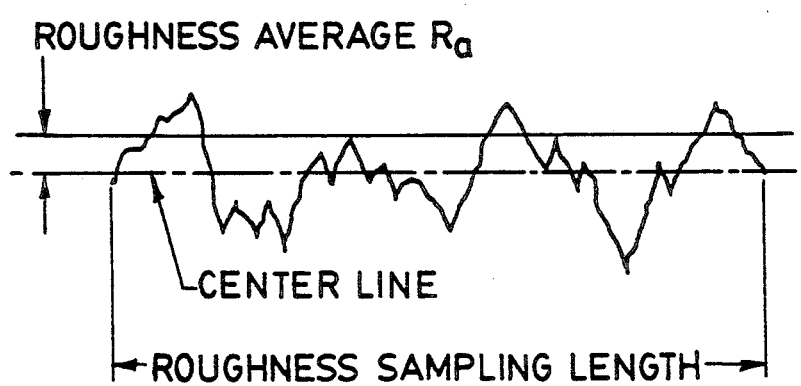
FIG. 3 is an example of graphical determination of roughness average.

"Roughness Average Ra" (*) Roughness average is the arithmetic average of the absolute values of the measured profile height deviation taken within the sampling length and measured from the graphical center line. For graphical determinations of roughness average, the height deviations are measured normal to the chart center line as shown in FIG. 3.

* SURFACE TEXTURE (Surface Roughness, Waviness, and Lay) ANSI/ASME B46.1-1985, pages 2, 4, 7, 30 and 33.

The arithmetic average deviation from the center line is $$R_a = \frac{1}{L} \int_{x=0}^{x=L} |y| dx$$

where
$R_a$ = arithmetic deviation from the center line
L = sampling length
y = ordinate of the curve of the profile An approximation of the average roughness $R_a$ may be obtained by adding the y increments shown above, without regard to sign and dividing the sum by the number of increments:

$$R_a \text{ (approx.)} = \frac{y_1 + y_2 + y_3 \ldots + y_N}{N}$$

Roughness average is expressed in microinches or micrometers. The roughness average Ra of the substrate surfaces to which protective and decorative sheet materials are adhesively bonded within the scope of this invention ranges from about 1 to about 100 microinches 0.025 to about 2.5 micrometers), depending on the surface energy of the substrate.

"Surface energy" is quantified in terms of ASTM Critical Surface Tension of Wetting as determined by the standard ASTM D2578-84 test method. See page 20 of "Contact Angle Wettability and Adhesives" No. 43 of the "Advances in Chemistry Science" published 1964 by the American Chemical Society.

In practicing this invention, applicant has observed that in a paint-coated film that has been bonded to a three-dimensional substrate by the thermoforming method, those areas that had undergone stretching in order to cover contoured substrate portions were less prone to texturing than areas which had remained unstretched. That observation points to the desirability of applying some stretch to the film prior to or during the bonding step. This feature of the invention is illustrated in a working example (Example 13) of this application. For example, texturing can be avoided or eliminated when a paint-coated film is bonded to a substrate surface that has a wetting tension of about 60 dynes/cm and an average surface roughness (Ra) of about 30 microinches. While it is generally desirable to have conditions under which both surface roughness and surface tension are relatively high, e.g., 100 microinches and 80 dynes/cm, respectively, good results can also be obtained when a relatively low surface tension (e.g., 50 dynes/cm) is combined with a relatively high surface roughness (e.g., 100 microinches) or, conversely, a relatively low surface roughness (e.g., 2 microinches) with a relatively high surface tension (e.g., 90 dynes/cm).

Pigmented primer coats applied to a substrate surface in accordance with certain aspects of this invention include any suitable compositions which, after curing, will adhere to the substrate such that they can be abraded to provide the desired surface tension and surface roughness.

While Applicant does not want to be bounded by theoretical explanations, it is postulated that in the case of the application of a primer coat on the substrate surface, an ingredient, such as a pigment of the primer compositions may be exposed during the abrading treatment which provides the desired surface energy level. Aqueous pigment-containing resin compositions are highly useful as such coating compositions and they can be applied to the substrate surface by any conventional method, such as by coating, dipping, brushing, spraying, etc. Although uncoated steel is better for texturing, if the electrodepositable coating is present, then it should be abraded to avoid or minimize texturing.

By way of example, the following patents, the disclosures of which are hereby incorporated herein by reference, disclose suitable primer compositions, together with methods for their preparation and application:

1) Rosso et al. U.S. Pat. No. 3,839,679, which discloses quaternary ammonium salt group-containing resins formed by reacting a polyepoxide with a tertiary amine salt;

2) Wismer et al. U.S. Pat. No. 3,928,156, which discloses zwitterion-containing compositions;

3) Bosso et al. U.S. Pat. No. 3,937,679, which discloses electrodepositable resin compositions;

4) Bosso et al. U.S. Pat. No. 3,962,165, which disclose quaternary ammonium salt-containing resin compositions;

5) Bosso et al. U.S. Pat. No. 4,071,428, which discloses cured coating compositions including quaternary ammonium salt group-containing resins;

6) Jerebek et al. U.S. Pat. No. 4,104,147, which discloses coating compositions comprised of an acid-solubilized polyepoxide-amine adduct;

7) U.S. Pat. No. 4,260,720, which discloses cationic electrodepositable resins derived from a polymercapto-chain extended polyepoxide; and 8) Wismer et al. U.S. Pat. No. 4,419,467, which discloses cured coatings which are comprised of aqueous dispersions of a cationic resin derived from polyepoxides and prepared by contacting the polyepoxide with a particular polyether polyol and heating the two together to form a resin which may then be reacted with a cationic base-group former such as an amine and acid.

Pigments contained in the resin compositions may be of any conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually within the range of 0.02 to 1:1, expressed as pigment-to-resin ratio. The invention is further illustrated by the following examples:

EXAMPLE 1

Comparison

A carrier film was prepared from a blend described in U.S. Pat. No. 4,582,876 as follows:

A mixture of 55:45% by weight of polyester (1) and Dylark ® Styrene Copolymer 600 was compounded by extrusion. Polyester (1) was derived from terephthalic acid, 19 mole % ethylene glycol and 81 mole % 1,4-cyclohexanedimethanol. Dylark ® Styrene Copolymer 600 is a rubber modified styrene-maleic anhydride copolymer available from ARCO Chemical Company, a division of Atlantic Richfield Company.

The blend was heated to 260°-290° C. and extruded through a dye into a nip comprising two temperature-controlled chrome plated stainless steel rollers. The extruded web was then cooled on a chill roller. The thermoplastic film had a mean thickness of about 0.2 mm and a maximum thickness deviation of less than 0.02 mm.

The carrier film prepared as described was coated with a thin layer of an aqueous tie-coat composition as described in Table I. After drying, the thickness of the tie-layer was approximately 0.0005 mm.

TABLE I

| Tie-Coat Composition | |
|---|---|
| Ingredient | Approx. % Weight |
| Melamine-Formaldehyde Resin | 1 |
| Ethylene Glycol Monohexyl Ether | <1 |
| Deionized Water | 75 |
| Toluene | 1 |
| Normal Butyl Alcohol | <1 |
| N,N-Diethyl Ethanolamine | <1 |
| N-Methylpyrrolidinone | 2 |
| Diethylene Glycol Monobutyl Ether | 1 |
| Acrylic Resin* | 9 |
| Urethane Resin** | 9 |
| FC170 Surfactant, sold by 3M Co. diluted with water to a total solids content of 3.0% by weight | 0.05 |

*Styrene-butyl acrylate-butyl methacrylate terpolymer
**Reaction product of methylene dicyclohexyl diisocyanate and an aliphatic diol Over the dried tie-layer was then coated an aqueous polyurethane white paint composition as listed in Table II. The resulting layer was dried to a thickness of about 0.04 mm.

TABLE II

| Paint Composition | |
|---|---|
| Ingredient | Approx. % Weight |
| Titanium Dioxide | 25 |
| Ethylene Glycol Monohexyl Ether | 5 |
| Diethylene Glycol Monobutyl Ether | 1 |
| Deionized Water | 45 |
| N,N-Dimethyl Ethanolamine | 1 |
| N-Methylpyrrolidinone | 5 |
| Urethane Resin | 20 |

Over the dried paint layer was coated a clearcoat layer of the composition described in Table III.

TABLE III

| Ingredient | | Approx. % Weight |
|---|---|---|
| A | Urethane Resin | 60 |
| | Toluene | 39 |
| | Benzotriazole | 1 |
| B* | Polyfunctional aliphatic isocyanurate resin based on 1,6-hexamethylene diisocyanate | 100 |

*Available as Desmodur N-3300 from Mobay Corporation Coatings Division

Ingredient A diluted to 53% with acetone and Ingredient B diluted to 70% solids with 50/50 mixture of acetone and toluene were mixed and coated onto the paint layer and dried to form a clear layer having a thickness of 0.06 mm.

The dried, clear-coated sheet material was wound on a take-up roll, then unwound, and once more drawn through a coating station to form on the backside of the carrier film opposite the tie-layer a thin layer of a pressure-sensitive adhesive which, upon continuous drying to a tacky state, had a thickness of 0.07 mm. The adhesive was a clear, aqueous acrylic adhesive comprised of 50 weight percent water and 50 weight percent acrylic resin. It is supplied as "SHRINK WRAP ADHESIVE HC7803-VAC" by PPG Industries, Inc. of Pittsburgh, Pa.

A thin polyester film having a thickness of about 0.04 mm was applied to the backside adhesive layer as a temporary protective release sheet to permit handling of the sheet material prior to its use.

After removal of the protective release sheet from the backside of the carrier film, a 12.5×40 cm sample of the material was drawn by vacuum thermoforming into contact with a test panel and adhesively bonded thereto. The test panel carried an electrodeposited unabraded surface coat comprised of an automotive pigmented resin composition which is commercially available from PPG Industries, Inc., Pittsburgh, Pa., under the trade designation ED 3150. The sample was heated with infrared lamps to 135° C. before initiating the vacuum drawdown. As it was drawn over the approximately horizontally held test panel, the sample was stretched up to about 50% as measured areally or by decrease of thickness.

The finished product consisting of the test panel having the paint-coated film bonded thereto had an excellent smooth surface appearance, including good gloss and distinctness of image. The product was then subjected to a high-temperature treatment at 93° C. for one hour and allowed to cool to room temperature. The so treated product was visually inspected and found to have lost its initial surface smoothness by virtue of having developed a textured surface under the influence of the excessive heat.

EXAMPLE 2

Invention

The procedure of Example 1 was repeated with the following variation: Prior to the thermoforming step, the surfaces of the primer coat of several identical panels were roughened carefully with very fine (600 grit) sandpaper to various degrees of roughness ranging from fine to coarse. Result: Texturing was much reduced, and in some cases, depending on the degree of sanding, eliminated, a fine substrate surface roughness being preferred over a coarse substrate surface roughness to prevent "show-through".

EXAMPLE 3

Invention

In a variation of the procedure of Example 2, the primer surface was sandblasted instead of sandpapered. This procedure was found to be a more controlled and efficient means of surface treatment. Result: Again, a lighter surface treatment (i.e., one that had created an average surface roughness not in excess of about 100 microinches) was preferred to prevent "show-through".

EXAMPLE 4

Invention

In variations of the procedures described in Examples 2 and 3, the white paint layer of the paint-coated film was replaced with a black paint layer which was coated from the following composition:

| Ingredient | Approximate % Weight |
| --- | --- |
| Deionized water | 55 |
| Urethane resin | 20 |
| Ethylene Glycol Monohexyl Ether | 5 |
| N-Methylpyrrolidinone | 5 |
| Diethylene Glycol Monobutyl Ether | 1 |
| N,N-Dimethyl ethanolamine | 1 |
| Titanium Dioxide/Mica | <1 |
| Silica | <1 |
| Carbon Black | <1 |
| Isopropyl Alcohol | <1 |

Result: Texturing was reduced or eliminated depending on degree of surface abrading, much like in Examples 2 and 3.

EXAMPLE 5

Invention

The procedure of Example 1 was repeated with the following variation: The film was bonded to an unprimed, unpolished steel panel having an average surface roughness (Ra) between 25 and 40 microinches (ASTM D 609). Result: Texturing was greatly reduced or eliminated.

EXAMPLES 6-9

Invention

The procedures of Examples 2, 3, 4 and 5 were repeated with the following variation: The film was applied as a "toning and styling film" by manually placing it on the panel surface—adhesive layer down—and then applying pressure with a squeegee while gently heating the film surface with an air gun (hair dryer). Result: No or very minor texturing had occurred.

EXAMPLE 10

Comparison a

The procedure of Example 1 was repeated with an unprimed Nylon test panel.

Comparison b

The procedure of Example 1 was repeated with a Nylon test panel which had been surface primed with an enamel (commercially available from PPG Industries under the trade designation E 5645).

Comparison c

The procedure of Example 1 was repeated with a Nylon test panel which had been surface primed with a lacquer (commercially available from PPG Industries under the trade designation DEL 33434). Result: Texturing occurred in each of the three cases.

EXAMPLE 11

Invention

The procedures of Example 10, parts b and c, were repeated with Nylon test panels whose respective enamel and lacquer surface had been gently sandblasted prior to the film bonding step. Result: Texturing was essentially eliminated.

EXAMPLE 12

Comparison

The primed surfaces of several metal panels prepared as described in Example 1 were exposed to U.V. radiation of varying intensities by the procedure described in column 7 of Bragole et al. U.S. Pat. No. 4,321,307. After bonding to the so treated surfaces of samples of a paint-coated film as described in Example 1, and subsequent HTRT treatment, the final product was visually inspected. Result: The irradiation treatment had no noticeable effect on the elimination of texturing.

EXAMPLE 13

Invention

A paint-coated film as described in Example 1 was heated to 135° C. and then adhesively bonded by a known vacuum thermoforming procedure onto an inclined metal test panel with an electrodeposited unabraded surface coat. The inclination of the test panel had been adjusted such that the lower portion of the film was stretched by more than 50%. The so bonded panel was subjected to the HTRT conditions described above and then visually inspected. Result: Texturing had regressed in the direction of film stretch, with areas close to the lower end of the panel where the paint-coated film was stretched more than about 50% being essentially devoid of texturing. As was mentioned before, this result points to the possibility of enhancing texture avoidance by stretching the film just prior to or during the bonding procedure.

The invention has been described in detail with particular reference to certain preferred embodiments thereof, but it will be understood that variations and modifications can be effected within the spirit and scope of the invention.

What is claimed is:

1. A process for adhesively bonding a protective and decorative, stretchable, thermoplastic polymeric film to a substrate, wherein said process reduces or eliminates the tendency of the bonded polymeric film to develop an undesirable surface texture, said process comprising the steps of:
   (a) applying a layer of a pressure-sensitive adhesive composition to a surface of said film;
   (b) treating a surface of the substrate which is to be bonded to said film to roughen the surface and to raise its surface energy to a level corresponding to a critical surface tension of wetting of at least about 40 dynes per cm and to provide a substantially uniform surface roughness; and
   (c) pressing the adhesive layer of said film into bonding contact with the treated surface of the substrate, wherein the roughness of the roughened surface ranges from about 1 to about 100 microinches, and the surface being sufficiently smooth such that said film when bonded thereto has a 20° glass of at least about 80 and a DOI of at least about 80 as measured by ASTM TEST E-430.

2. The process of claim 1 wherein the substrate is an exterior automobile body panel.

3. The process of claim 1 wherein said film comprises a thermoplastic carrier film, a protective and decorative layer adhered to one surface of said carrier film, a pressure-sensitive adhesive layer on the opposite side from said protective and decorative layer, and a clear topcoat layer overlying said protective and decorative layer.

4. The process of claim 3 wherein said film is bonded to the substrate by vacuum thermoforming.

5. The process of claim 3 wherein the protective and decorative layer is a paint layer.

6. The process of claim 1 wherein the pressure-sensitive adhesive comprises an acrylic composition.

7. The process of claim 1 wherein the substrate has an unprimed, roughened metal surface.

8. The process of claim 1 wherein the substrate is a metal having a roughened pigmented surface coat.

9. The process of claim 1 wherein the substrate is a plastic having a roughened pigmented surface coat.

10. The process of claim 8 wherein the surface coat has been roughened by sandpaper.

11. The process of claim 8 wherein the surface coat has been roughened by sandblasting.

12. The process of claim 1 wherein the sheet material is bonded to the substrate surface by thermoforming.

13. The process of claim 1 wherein the sheet material is bonded to the substrate surface by physical pressure.

14. The process of claim 1 wherein the sheet material is a toning and styling film.

* * * * *